United States Patent

[11] 3,538,972

| [72] | Inventors | Peter A. Yurcick<br>South River and<br>Charles Tyler Bills, Metuchen, New Jersey |
|---|---|---|
| [21] | Appl. No. | 722,656 |
| [22] | Filed | April 19, 1968 |
| [45] | Patented | Nov. 10, 1970 |
| [73] | Assignee | Ashland Oil & Refining Company<br>Houston, Texas<br>a corporation of Kentucky |

[54] ADHESIVE SYSTEMS METHOD OF BONDING REINFORCEMENT TO RUBBER AND RESULTING PRODUCTS
12 Claims, 3 Drawing Figs.

[52] U.S. Cl.................................................. 152/354,
8/115.6, 156/110, 161/88, 161/89, 161/92,
161/143, 161/144, 161/176, 161/187, 161/241,
260/29.3, 260/54
[51] Int. Cl......................................................... B32b 25/12,
B32b 2/06; B60c 1/00
[50] Field of Search........................................... 161/89,
187, 241; 156/110(A); 260/29.3, 54; 152/354

[56] References Cited
UNITED STATES PATENTS

| 2,346,440 | 4/1944 | Lessig............................ | 161/187X |
| 2,975,095 | 3/1961 | Bletso............................ | 161/244 |
| 3,013,599 | 12/1961 | Riggs............................. | 152/362 |
| 3,018,207 | 1/1962 | Danielson..................... | 156/110 |
| 3,215,677 | 11/1965 | Fave et al. .................... | 260/79 |
| 3,219,628 | 11/1965 | Doedens et al. .............. | 260/29.3 |
| 3,221,079 | 11/1965 | Harris........................... | 260/29.3 |
| 3,338,975 | 8/1967 | Farber et al. ................. | 161/187X |
| 3,385,824 | 5/1968 | Smith............................ | 260/52 |

Primary Examiner—John T. Goolkasian
Attorney—Walter H. Schneider

ABSTRACT: A polyester fiber reinforcement is coated in a single-dip process with an aqueous mixture of rubber latex, two-stage liquid polyhydric phenolaldehyde phenol sulfide resin and sufficient additional reactive aldehyde to render the resin thermosetting upon reaction therewith. After drying, the coated reinforcement is brought into contact with an unvulcanized solid rubber matrix containing curatives, and the resultant composite is subjected to sufficient heat and pressure to vulcanize and form the rubber into a reinforced article displaying improved adhesion between the rubber and reinforcement under conditions of high temperature and dynamic stress.

Patented Nov. 10, 1970

3,538,972

Inventor
Peter A. Yurcick
C.T. Bills

By Walter H. Schneider
Attorney 3,538,972

ADHESIVE SYSTEMS METHOD OF BONDING REINFORCEMENT TO RUBBER AND RESULTING PRODUCTS

BACKGROUND OF THE INVENTION

Rubber articles frequently include textile reinforcing material, such as fibers, cords and fabric. To secure a strong and lasting bond between rubber and reinforcement, the latter is coated with an adhesive. Then the adhesive-coated reinforcement is embedded in the rubber to form a tire or other rubber article, and the article is vulcanized. If the resultant adhesive bond is deficient, the article is prone to fail in service, especially when subjected to heat and dynamic stresses. In a pneumatic tire, the adhesive may represent only a very minor part of the total weight of materials (e.g., one-half of 1 percent), but its effectiveness makes the difference between the success and failure of the tire.

At a very early stage in the tire building art, when cotton fiber tire cords were the predominant reinforcing material, it was suggested that an adhesive based upon a resorcinol/formaldehyde resin in admixture with rubber latex would assist in forming a secure bond between the rubber and the reinforcement. Such adhesives, named RFL after the initials of the three principal components, came into wide commercial use. Later, when cellulosic fibers such as rayon were replacing cotton, it was suggested that RFL adhesives were inadequate for use with the new reinforcing materials and that the resorcinol/formaldehyde resin should be replaced with one in which the principal component (on a molar basis) was formaldehyde, the second component, representing a minor proportion of the total, was aniline, and the third component, representing the smallest portion of all was resorcinol. The suggested replacement resin was to be formed "in situ." That is, the formaldehyde, aniline and resorcinol were to be mixed in the tirebuilding or cord-coating plant, in unreacted form with the rubber latex, and reacted in the presence of the latter during a lengthy ageing period (e.g.,24 or as much as 48 hours). The handling of aniline in the tire building and cord-coating plants, where the personnel were not ordinarily knowledgeable in chemistry, would have been a potentially hazardous operation, since aniline, in unreacted form, is highly toxic.

Still another proposal for replacement of RFL adhesives was to use an adhesive formed of rubber and any of various sulfur compounds dissolved and/or dispersed in a hydrocarbon solvent. The evaporation of the solvent during the drying of the coated reinforcement would result in the emission of fumes. The recovery measures required to prevent the spread of these fumes about the rubber plant, to avoid potential fire and toxicity hazards and loss of the expensive solvent, were in themselves expensive. Thus, the use of aqueous RFL adhesives, without aniline, continued, but the suggestion of forming the resin "in situ," in the presence of the latex, was accepted.

As various types of fibers formed from synthetic polymers became available, their use in rubber reinforcement was investigated, and one such type, polyamide fibers, commonly referred to as nylon, achieved a position of considerable importance along with rayon. RFL adhesives formed "in situ" were adopted for use with nylon reinforcement, and such use, along with use on rayon fibers, continues today.

Linear polyester fibers were discovered in the early forties, and in the late forties and fifties were intensively evaluated for use in tire cords. This examination showed the physical properties of polyesters superior to nylon on a number of counts, but also disclosed one notable and critical shortcoming extremely poor adhesion to rubber.

Thus, in the late fifties began an exhaustive search for a tire cord adhesive which would overcome this shortcoming. According to F. J. Kovac and T. M. Kersker in their paper entitled "The Development of the Polyester Tire," Textile Research Institute, 33rd Annual Meeting, Mar. 14, 1963, none of the adhesive systems existing in 1958 were adequate for use with polyesters. In their U.S. Pat. application filed Oct. 24, 1961, now U.S. Pat. No. 3,179,547, commenting specifically on the RFL adhesive, Kigane, Togawa and Yamada point out that it "does not give satisfactory results in case of the adhesion of polyester textiles to rubbers." A similar conclusion was put forth by Aitken, Griffity, Little and McLellan in their Feb., 1965 "Rubber World" article on their isocyanate trimerization product-modified tire cord adhesive.

Because of the inadequacies of RFL adhesive systems, an isocyanate-based polyester tire cord adhesive system was developed. While isocyanate-based adhesives have provided a means for obtaining more durable adhesive bonding of polyesters, two-stage processes, involving two separate applications of adhesive to the fiber (two "dips") are frequently required to develop acceptable adhesion. Also, the isocyanates are toxic and expensive. Treated cord shelf life has been reported as poor, and some reports have indicated poor film creep characteristics. Accordingly, the search for improved adhesives continues.

One proposal specifically addressed to the problem of bonding polyesters to rubber involved the use of a resin adhesive formed "in situ," in the presence of rubber latex and a dithiocarbamate. Still another more recent proposal was for a two-dip system in which the first dip was an aqueous phenol aldehyde latex adhesive and the second dip, which was to be applied after drying of the first dip, was a solvent solution of chlorosulfonated polyethylene. Thus, the quest goes on. It is apparent therefore that there is still a need for improvements in tire cord adhesives.

OBJECTS

It is the principal object of this invention to fulfill the above. Still another object is to provide an improved method and adhesive composition enabling formation of a commercially acceptable bond between a polyester tire cord and the rubber in a pneumatic tire in a single dip process. Yet another object is the provision of a reinforced rubber article such as a pneumatic tire embodying adhesives of the aforementioned character. Another object is the provision of a novel synthetic resin having utility in resin/latex adhesive systems for bonding polyester fibers to rubber. Other objects of the invention will suggest themselves to persons of ordinary skill in the art upon consideration of the following discussion.

BRIEF SUMMARY OF THE INVENTION

It has been found that the objects of the invention can be attained with an adhesive composition containing a highly stable two-stage resin which consists essentially of the reaction product of a polyhydricphenol, an aldehyde, and a phenol sulfide compound having the formula:

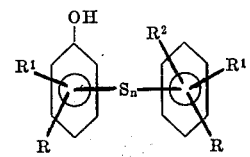

wherein $n$ is 1 through 4, inclusive, each R may independently be either H or OH; and each $R^1$ may independently be H, or a radical containing from one to about 12 carbon atoms, including alkyl, alkylene, aryl and cycloalkyl radicals, such as methyl, ethyl, propyl, isopropyl, butyl, isobutyl, sec.-butyl, t-butyl, amyl, isoamyl, t-amyl, hexyl, heptyl, octyl, 2-ethyl hexyl, isooctyl, tert-octyl, nonyl, isononyl, dodecyl, propenyl, hexenyl, actenyl, decenyl, eicosyl, phenyl, benzyl, α-methyl benzyl, dimethylbenzyl, dimethylphenyl, tolyl, xylyl, cyclohexyl, cyclopentyl and napthyl, or an alkoxy, halogen, nitro, amino or substituted amino group. It is not necessary but is preferred that each of the phenyl groups contain a nuclear-substituted hydroxyl group. Thus, $R^2$ may be H, but is preferably OH.

The term "two-stage" throughout this specification and in the appended claims, refers to resins which have been produced with amounts of ingredients and conditions which have been selected to avoid production of a thermosetting product. It is important that the resin used in the invention not be rendered thermosetting in character until after admixture with the latex and application to the reinforcement. Accordingly, the relationships which exist between the amounts of reactants in the aforementioned two-stage resin are essential features of the invention. Throughout this specification and claims, except where the contrary is clearly indicated, the amounts of such reactants will be expressed in terms of moles (molecular weight units). Specifically, the number of moles of reactants should be in the following ranges:

| Reactant: | Moles (about) | Preferred (about) |
|---|---|---|
| Polyhydricphenol | 1 | 1 |
| Phenol sulfide | 0.01-1 | 0.05-0.4 |
| Aldehyde | 0.05-1 | 0.5-0.7 |

The above-described resin is prepared in a liquid state and contains about 50 to about 80 percent by weight of resin solids, plus water resulting from the condensation reaction as well as water which may have been introduced with the aldehyde. An aqueous dip-coating solution is formed by mixing the resin with an aqueous synthetic or natural rubber latex, and sufficient additional aldehyde to convert the resin to a thermosetting state in the presence of the rubber of the latex and in contact with the reinforcement coated therewith. The weight ratio between the rubber solids in the synthetic or natural rubber latex and the resin solids in the above-described resin, herein after referred to as the "rubber-to-resin ratio," is in the range of about 12:1 to about 2:1. The amount of additional aldehyde that is required can readily be determined empirically by routine experiments, or it can be calculated. Generally speaking, if the molar ratio between the sum of the moles of aldehyde incorporated in the two-stage resin and of the moles of additional aldehyde incorporated in the dip-coating solution bears a ratio on the order of about 1:1 to about 2.5:1 to the moles of polyhydricphenol in the resin, the resin can readily be converted to thermosetting form in the subsequent treatment of the coated reinforcement. The dip-coating composition may also contain other conventional dip-coating additives, and will contain sufficient water to provide a total solids content in the range of about 10 to about 30 percent by weight.

In accordance with the invention, a dip-coating composition, as above described, is applied by any suitable method to reinforcing fibers, and dried in a drying zone maintained at a temperature of about 250°F. to about 450°F. for a time in the range of about 40 seconds to about 10 minutes, it being understood that when temperatures at the lower end of the above range are employed, residence times approaching the maximum of 10 minutes are required, and vice versa. The dip-coating composition is applied in sufficient amount to increase the weight of the dried fibers by an amount in the range of about 1 to about 15 percent by weight of the uncoated fibers.

Thereafter, the dried, coated fibers are brought into contact with (e.g., embedded in) a vulcanizable, compounded rubber stock. The stock and fibers are then subjected to sufficient heat and pressure to form a bond through the dried adhesive between the polyester fiber and the rubber, and to vulcanize the rubber and form it into a desired shape.

ADVANTAGES OF THE INVENTION

Industry recognized adhesion tests have demonstrated that the novel resin and adhesive compositions herein-described represent a marked improvement over conventional resorcinol formaldehyde resins and RFL adhesives prepared therefrom. Definite improvements have been produced in the static and dynamic adhesion of synthetic tire cords and plies, and better resistance to fatigue and to heat degradation of adhesive bonds formed in reinforced rubber articles has been noted. High speed tire performance and safety may thereby be improved.

The exact reasons for the improvements in adhesion brought about by the present invention are at present a matter of speculation. It might be postulated that the sulfur in the phenol sulfide compounds enters into the vulcanization reaction and/or cross links with the rubber in the latex of the adhesive and in the rubber matrix forming the reinforced object; however, if this were to occur, it would be rather surprising in view of the relatively sheltered location of the sulfur linkage between the phenolic groups in the phenol sulfide. The degree of inaccessibility of the sulfur linkage is particularly enhanced, when such linkages and hydroxy groups connect to adjacent carbon atoms in the phenolic groups of the phenol sulfide compounds, such as in the case of bis (2,4 - dihydroxyphenyl) sulfide. Even so, resins synthesized from such compounds have been formulated into adhesives, and the testing of reinforced rubber articles made with such adhesives has demonstrated that they produce the advantages described above. Thus, under circumstances suggesting the inaccessibility of the sulfur linkages for taking part in vulcanization and/or cross linking, improvements in bond strength are still attained. Thus, the reasons for the superior results attained with the present invention are still conjectural. Regardless, however, of whether the theory behind them is understood, the existence of the improvements in bond strength made possible by the invention has been established, and it is therefore believed that a worthwhile advance in the art has been made.

Because the two-stage resin used in the invention is not prepared in situ, no lengthy ageing operation in the tire plant is required. Thus, the provision of storage vats in the cord-dipping facility for ageing adhesives can be eliminated. Also, the difficulties of disposing of partially reacted adhesive in case of sudden work stoppages are reduced. Furthermore, the lead time for getting back into production after a work stoppage is reduced.

In situ preparation of adhesives in the tire-building or cord-coating plant has other disadvantages which are overcome through use of the present invention. These reactions are often carried out at ambient temperature with little or at best imprecise control over the temperature prevailing in the adhesive-forming mixture. Consequently, the extent of reaction of the resin-forming ingredients varies, sometimes resulting in the formation of a nonliquid or stringy mass which is completely unsuitable for the coating operation.

RESIN REACTANTS

As the polyhydricphenols possessing the qualifications for use in the operation of this invention may be mentioned those having the hydroxyl groups in the benzene nucleus meta with respect to one another such as resorcinol, phloroglucinol, orcinol and similar compounds. It should be understood, however, that the invention is not limited to these specific polyhydricphenols. Dihydric phenols, including not only the foregoing, but also catechol and hydroquinone, are a preferred class.

Most commonly, formaldehyde is the aldehyde used, on account of its reasonable cost and ready availability. It may be introduced in aqueous and/or alcoholic solution, as powder, or in any other suitable form. However, other aldehydes which are capable of complete reaction with the polyhydric phenol and phenol sulfide may also be used in the invention. For instance furfuraldehyde, acetaldehyde, or crotonaldehyde may be substituted wholly or in part. Likewise, instead of formaldehyde materials may be used which yield formaldehyde such as for example hexamethylenetetramine. Furthermore, certain reaction products of formaldehyde which will condense or polymerize with polyhydricphenols and additional compounds capable of polymerizing with an aldehyde may be used such as for example the reaction product of formaldehyde and dimethylamine.

As indicated by the above structural formula, the phenol sulfide compounds used in the present invention include for example:

I. 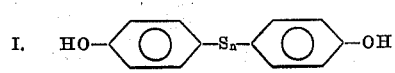

II. 

III. 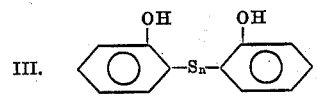

IV. 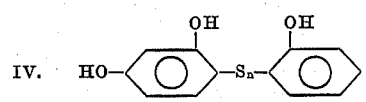

V. 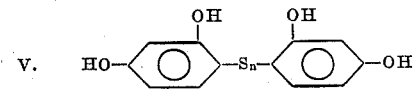

VI. 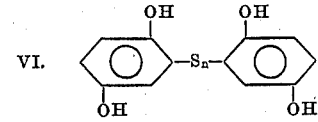

VII. 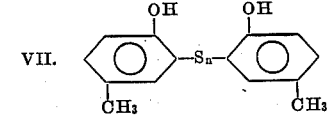

VIII. 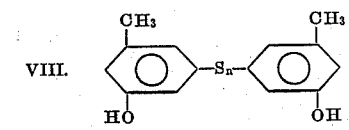

IX. 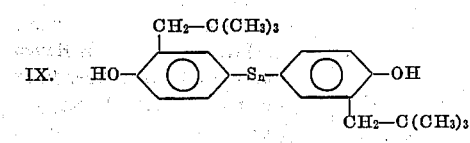

X. 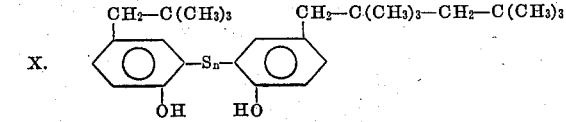

XI. 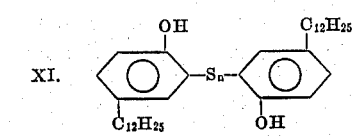

XII. 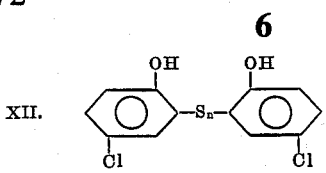

XIII. 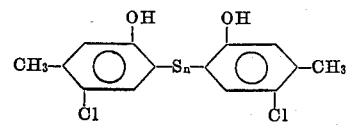

XIV. 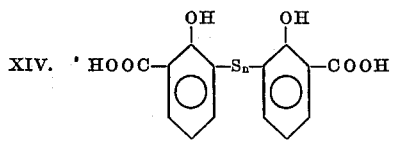

XV. 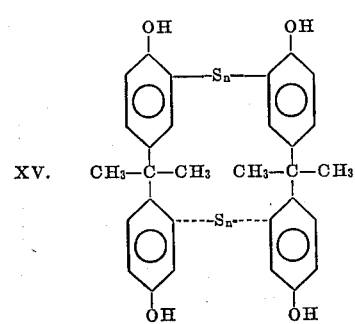

XVI. 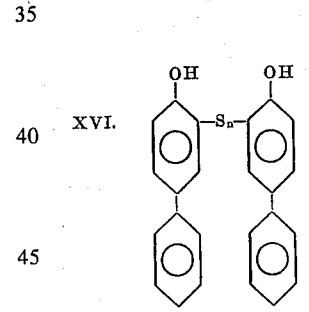

XVII. 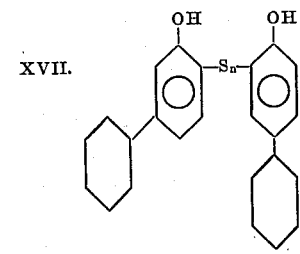

XVIII. 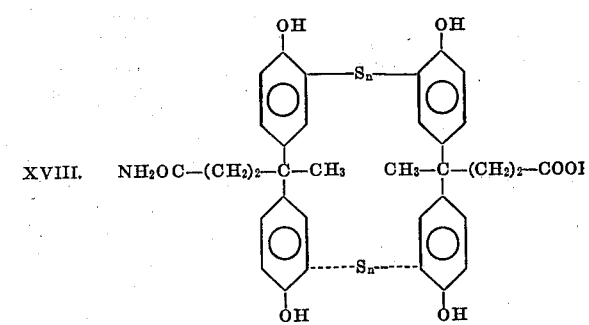

XIX. 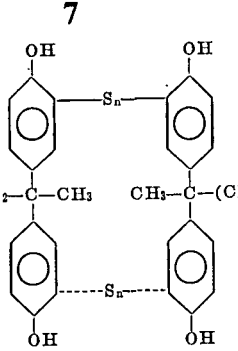

wherein n = 1 through 4, inclusive, and preferably 1 to 2, and

XX. 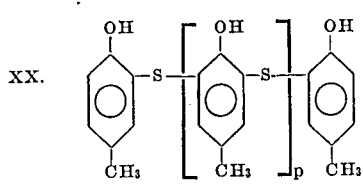

wherein P = 1 through 5, inclusive.

XXI. 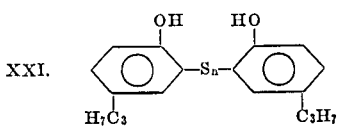

The foregoing are but a few examples of the many phenol sulfide compounds (including polymers) which may be used, and it should be understood that the positions at which the various substituent groups are bonded to the aromatic nuclei, and the positions through which the sulfur atoms or chains are bonded thereto may be varied at will provided at least the majority of the aromatic nuclei are provided with an open ortho and/or para position with respect to a hydroxyl group for reaction with the aldehyde.

Usually, it is desirable to prepare the resin in the presence of a small amount of acid catalyst (including condensing agents for the polymerization reaction.) Such acidic catalysts may be, for instance, phosphoric, sulfuric, hydrochloric, oxalic, phenol sulfonic, octyl phenol sulfonic or other acid. However, basic catalysts may also be used. The amount of catalyst employed should be any amount up to about 0.5 moles, and preferably up to about 0.1 moles, per mole of polyhydricphenol, said amount being an amount which is effective to cause substantially complete condensation of the resin-forming reactants.

PREPARATION OF THE RESIN

The ingredients of the resin employed in this invention are quite reactive. Therefore, gradual addition of the reactants is necessary to control the exotherm. Normally, after all the reactants have been brought together, they are maintained under the reaction conditions for a substantial period (e.g., at least about an hour) to ensure complete reaction.

The reactions are normally carried out at temperatures in the range of about 60°C. to about 130°C., under reflux. These temperatures are not critical, but instead represent workable temperature ranges in which the reaction products can be produced at a reasonably rapid rate for commercial operations. While the reactions will take place at higher or lower temperatures, problems of temperature control, excessive vaporization of reactants and uneconomical manufacturing output may be encountered which make the higher or lower temperatures less desirable. Pressure is not normally critical in the process, so atmospheric pressure, or sub-or super-atmospheric pressure may be used.

The reactions may be conveniently carried out in aqueous medium, and, if desired, additional organic solvents may also be employed. For example, low molecular weight alcohols, ketones and esters such as methanol, acetone and ethyl acetate may be added to the reaction mixture to help dissolve the various components where such is desired or necessary.

The product may be recovered as a resin solution, or may be vacuum stripped and poured for recovery as a solid resin.

SUITABLE LATEXES

Suitable latexes for use in the present invention may be selected from the group consisting of natural rubber latex or a latex of conjugated diolefin polymer synthetic rubber, or mixtures thereof, or an aqueous dispersion of reclaim from such rubbers, or mixtures of any such latices and reclaim dispersions. Such conjugated diolefin polymer synthetic rubbers are polymers of butadienes-1,3, e.g., butadiene-1,3, isoprene, 2,3-dimethyl-butadiene-1,3, and polymers of mixtures thereof and copolymers of mixtures of one or more such butadienes-1,3, with one or more other polymerizable compounds which are capable of forming rubbery copolymers with butadienes-1,3, for example, up to 60 percent by weight of such mixture of one or more monoethylenic compounds which contain a

group where in at least one of the disconnected valences is attached to an electronegative group, that is, a group which substantially increases the electrical dissymmetry or polar character of the molecule. Examples of compounds which contain a $CH_2=C<$ group and are copolymerizable with butadienes-1,3 are aryl olefins, such as styrene, vinyl toluene, alpha methyl styrene, chlorostyrene, dichlorostyrene, vinyl naphtalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2 methyl-5-vinyl pyridine; methyl vinyl ketone. Examples of such conjugated diolefin polymer synthetic rubbers are polybutadiene, polyisoprene, butadiene-styrene copolymers (SBR) and butadiene acrylonitrile copolymers.

Various natural rubber latices have been successfully used heretofore in cord-dipping processes. Among the various commercially available natural rubber latices are the so-called "normal latex," centrifuge concentrated natural latex, creamed-concentrated natural latex, evaporation-concentrated natural latex, electrodecantation-concentrated natural latex and other forms of natural rubber latex commercially available and known in the art as Hevea latex such as Hevea brasillensis latex. A heat concentrated natural rubber latex which has been concentrated after the addition of soap and caustic according to the Revertex process as described in British Pat. No. 243,016 and known as "Revertex" contains 72 weight-percent solids, a dry rubber content of 67 percent, a specific gravity of 0.97 and a density of 8.1 pounds per gallon.

REINFORCEMENT

The terms "fiber" and "fibrous" are both used in a generic sense in this disclosure and in the appended claims to refer to textile elements suitable for rubber reinforcement purposes which are fibers, or which contain fibers, including filaments, fibers, yarns, strands, woven fabrics, cords, cord-fabrics and the like, whether of cotton, rayon, nylon, polyester, fiberglass or other natural or synthetic material.

RUBBER MATRIX

The solid rubber used in the present invention for making the rubber and fabric laminates for use in tire manufacture and for other purposes may be natural (Hevea) rubber or conjugated diolefin polymer synthetic rubber or mixtures of any of them including their reclaims. The invention contemplates any commercially compounded rubber stock employed in the manufacture of pneumatic tires, hose, conveyor belts and other industrial reinforced-rubber products. The rubbery material may also include any of the well-known compounding ingredients for rubber, such as vulcanizing agents and accelerators, antioxidents, fillers, reinforcing agents, emulsifiers, stabilizers, modifiers, and coloring agents, etc., in amounts and proportions in accordance with conventional compounding technique.

From the foregoing, it may be observed that the rubber compositions which are preferred for use in the present invention contain the following components (and, if desired, other components which do not destroy the essentially rubbery nature of the compositions) in about the number of parts indicated below:

| Component: | Parts |
| --- | --- |
| Rubber | 100 |
| Carbon black | 30-60 |
| Zinc oxide | 5-20 |
| Stearic acid | 1-4 |
| Accelerator | 0.2-2.5 |
| Antioxidant | 0.5-2.5 |
| Sulfur | 1-4 |

The compositions are mixed by conventional wet-masterbatching and/or dry milling techniques known to persons skilled in the art.

The dried cords treated in accordance with the invention are embedded in such rubber compositions by any suitable method to form a composite of such cords with the rubber matrix, and the matrix is then vulcanized with the treated cords in place therein. Suitable vulcanization conditions vary in a manner well understood by persons skilled in the art, depending in part upon the amounts of curatives present in the rubber compound, the thickness of the matrix and the type of article being formed, but generally the vulcanization conditions will be in the range of 0.5 to 90 minutes at about 200°F. to about 450°F., coupled with sufficient pressure to form the matrix to a desired shape.

DESCRIPTION OF A PREFERRED EMBODIMENT

Figure 1:
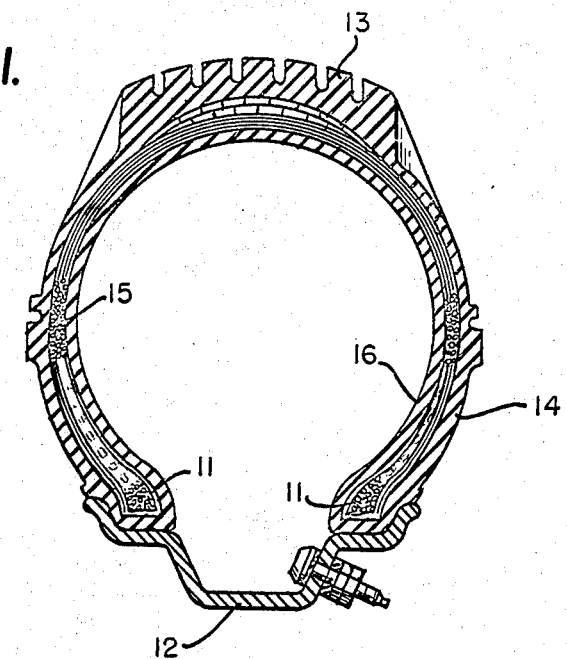
FIG. 1 is a vertical section of a pneumatic tubeless tire manufactured in accordance with the present invention.

In accordance with a preferred embodiment of the resin invention described herein, a resin is formed by condensing in an aqueous medium formaldehyde (the aldehyde) and bis (2-hydroxy-5-methylphenyl) sulfide (the phenol sulfide compound) with resorcinol (the polyhydricphenol) in a molar ratio of about 0.6 moles of the formaldehyde and about 0.1 moles of the sulfide compound to each mole of resorcinol, and is recovered as a liquid resin having a solids content on the order of about 65 to 70 percent.

The resultant resin is combined with water, additional formaldehyde and caustic in proportions indicated hereinafter (example IX) and is then combined with the preferred latex to form a preferred embodiment of the adhesive composition invention described herein.

The preferred latex for use in the present invention is an aqueous emulsion or disperion of vinylpyridine-butadiene-styrene terpolymer latex. Various commercially available latexes of this type are available under the trade names "Gentac" (General Tire), "Hycar 2518" (Goodrich) and "Pyratex B" (Naugatuck). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers for use herein are described in the following U.S. Pat. Nos.: Mighton 2,561,215; Cislak et al. 2,402,030; and Wilson 2,652,353.

In accordance with a preferred embodiment of the method of the present invention, an adhesive composition as above described is applied to polyester fibers. The preferred polyester fibers are the high molecular weight polyesters obtained from $\alpha,\omega$-glycols and dicarboxylic acids, particularly any one of the high molecular weight polyesters obtained from polymethylene glycols and the aromatic dicarboxylic acids. As the most typical of these can be cited polyethyline terephthalate which is obtained from ethylene glycol and terephthalic acid. Also, for example, there are the polyester fibers spun from polycyclohexane-1,4-dimethylol terephthalate. Suitable polyester copolymer and monopolymer fibers are commercially available under a variety of tradenames, including "Dacron" (Dupont), "Fortrel" (Fiber Industries), "Kodel" (Tennessee Eastman), "Teryline" (ICI - England, CIL - Canada), "Vyta-Cord" (Goodyear), and others.

The adhesive is applied to the fibers at a pickup (dry basis level) of about 5 percent by weight and then dried thoroughly. The dried fibers are then embedded in a solid rubber matrix.

The preferred solid rubber is a rubbery butadiene-1,3 polymer, including polybutadiene and butadiene copolymers, (e.g., the copolymers of butadiene-1,3 with styrene), particularly the rubbery copolymer resulting from the polymerization of a mixture comprising about 75 parts of butadiene-1,3 and about 25 parts of monomeric styrene may be used.

The rubber matrix with embedded adhesive-coated reinforcement is then formed into an object and vulcanized under the influence of heat and pressure. The preferred products of the invention are reinforced rubber tires, conveyor or transmission belting and hose in which the reinforcement is bonded to the rubber through an adhesive bond which includes an adhesive of the type described above. Such products are disclosed in FIGS. 1-3.

FIG. 1 depicts a tubeless tire which comprises a hollow toroidal substantially U-shaped member with spaced bead portions 11-11, inside of which are bead wires adhesively embedded and molded in rubber. The outer surface of the bead portion advantageously carries an air-sealing means (e.g., a layer of soft, tacky rubber) to aid in adhesion to rim 12 when the tire is inflated.

The particular structural details of the tire or rim surfaces are not essential features of the present invention. The outer surface of the tire also includes tread area 13 and sidewalls 14. The open portion of the horseshoe shaped tire faces that portion of the inner circumference of the tire which is adjacent the said tread area 13 of the tire.

The remaining construction of the tire may vary according to conventional fabrication, but in general the tire is a multilayered type of structure with an outer layer as above-mentioned. The layer next adjacent the outer layer generally comprises a carcass 15 which includes polyester fibers which have been treated with the above-mentioned cord-dipping adhesive, dried and then embedded in solid rubber, as above described, in accordance with the invention. The tire also includes an inner lining 16 and/or a tie-ply. This lining must be substantially impermeable to air. The above multilayers, at least three in number, are conventionally bonded or otherwise adhered together, for example, by cementing and/or specially by vulcanizing to form a tire of a unitary structure.

The expression "layer" as employed in this specification and in the accompanying claims is intended to include plies and liners, as well as such layers as the carcass, sidewalls, tread area, etc. of tires.

Persons skilled in the art are aware of a variety of cords composed of polyester fiber which are suitable for reinforcing pneumatic tires. For instance, one may employ a cord of about 2,200 deniers having a structure of 51S × 51Z twists per meter which has been obtained by spinning 48 filaments of polyethylene terephthalate into a yarn, drawing this yarn to make it into 250 deniers, taking four lengths of this yarn and imparting an undertwist in the Z-direction, followed by imparting an upper twist in the S-direction to two of the four undertwisted lenghts.

Figure 2:
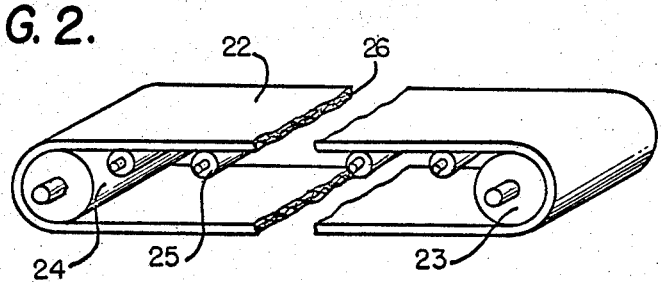
FIG. 2 is a generally edgewise perspective view of a conveyor belt structure produced in accordance with the present invention.

FIG. 2 shows a conveyor belt 22 being in position on drive roller 23, idle roller 24, and idle support rollers 25. The belt consists of a rubber containing imbedded therein a fabric 36 composed of a plurality of plies of polyester (and if desired, other) filaments, cords or threads which have been coated with the adhesive system of the present invention, embedded in the rubber and then vulcanized.

Figure 3:
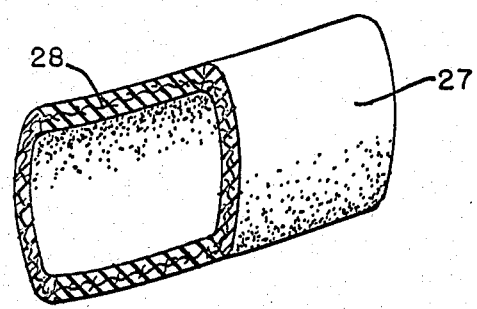
FIG. 3 is a perspective view, partly in section, of a portion of a hose produced in accordance with the invention.

FIG. 3 shows a central longitudinal section broken away of a flexible rubber steam hose 27 produced in accordance with the present invention. Again, as in the case of the conveyor belt, the steam hose consists of a rubber having embedded therein polyester textile reinforcement bonded to the rubber through an adhesive comprising the above-described resin and latex.

The following examples demonstrate the invention. They are given by way of illustration, not limitation. All parts are by weight, unless the contrary is clearly indicated.

EXAMPLE I 8.3 parts of a 50 percent solution of phosphoric acid, 1,900 parts of resorcinol, 380 parts of bis (2,4-dihydroxyphenyl) disulfide, and 500 parts of water are charged to a reaction vessel equipped with a condenser and an agitator. Mixture is heated to 105°C. Gradual addition of formaldehyde (44 percent) is begun. 711 parts of formaldehyde are added over a period of 35 minutes with the reaction temperature climbing as high as 115°C. during the addition. After formaldehyde addition is complete, the resin is condensed for 60 minutes at 100°C., cooled and poured.

The resultant product is a resin solution with a viscosity of 12 poises at 25°C. at a solids of 67.5 percent. The solution pH is 2.46 and sulfur content is 2.3 percent.

EXAMPLE II

A 2,970 parts portion of the product of example I is vacuum dehydrated to a temperature of 130°C. at 29-inches vacuum and a yield of 2,040 parts. The solid resin which results has a melting point of 99°C., a specific gravity of 1.391 and a sulfur content of 3.0 percent.

EXAMPLE III 1,425 parts of resorcinol, 285 parts of bis (2,4-dihydroxyphenyl) sulfide, and 375 parts of water are charged to a reaction vessel equipped with a condenser and an agitator. 8.3 parts of phosphoric acid (50 percent) is added and the mixture is heated to 105°C. 548 parts of formaldehyde (44 percent) are added gradually over a 30-minute period. Temperature rises to 113°C. during the addition. After the formaldehyde addition is completed, reflux is continued for an additional 30 minutes. The resin is cooled and poured. The product is a five poise, 67 percent solids resin with a pH of 2.02.

EXAMPLE IV

The resin prepared in example III is vacuum dehydrated at 29 inches vacuum to a temperature of 130°C. The solid resin which results has a melting point of 106.5°C., a pH of 2.3, a specific gravity of 1.382, and contains 2.13 percent sulfur.

EXAMPLE V 1,425 parts of resorcinol, 285 parts of bis (2,4-dihydroxyphenyl) disulfide, and 375 parts of water are charged to a reaction vessel equipped with a condenser and an agitator. 8.2 parts of phosphoric acid (50 percent) are added and the mixture is heated to 113°C. 548 parts of formaldehyde (44 percent) are added over a 16-minute period while maintaining the resin at reflux. Reflux is continued for 60 minutes after which the resin is cooled and poured. The resin has a viscosity of 12.6 poises, a pH of 1.70 and a solids content of 67 percent.

EXAMPLE VI

The product prepared in example V is vacuum dehydrated at 29-inches vacuum to a temperature of 130°C. The solid resin which results has a melting point of 110°C., a pH of 2.20, a specific gravity of 1.385, and a sulfur content of 3.08 percent.

EXAMPLE VII 361 parts of bis (2-hydroxy-5-methylphenyl) sulfide, 220 parts of 44 percent methanol free formaldehyde, 61.6 parts of 100 percent sodium hydroxide added as a 25 percent solution, and 587 parts of water are reacted with agitation in a reaction vessel at 70°C. for 25 minutes.

At this point a 1,900 parts charge of resorcinol is added to the vessel. The mixture is heated to 105°C., carefully controlling the exotherm which occurs. At 105°C., a slow addition of formaldehyde is begun. A total of 491 parts of 44 percent-methanol free formaldehyde is added gradually, with cooling to maintain temperature at 100—110°C., over a 30-minute period. When the formaldehyde addition is complete the condensation is continued at 105°C. for an additional 60 minutes. The resultant product is a dark colored resin with a viscosity of nine poises at 25°C. and a solids content of 63 percent. The resin solution contains 1.22 percent sulfur.

EXAMPLE VIII 320 parts of bis (2-hydroxyphenyl) sulfide, 220 parts of 44 percent-methanol free formaldehyde, 61.6 parts of 100 percent sodium hydroxide added as a 25 percent-solution, and 587 parts of water are reacted with agitation at 70°C. for 25 minutes.

A charge of 1,900 parts of resorcinol is added to the reaction vessel. The mixture is heated to 105°C., carefully controlling the exotherm which occurs. At 105°C., a slow addition of formaldehyde is begun. A total of 491 parts of 44 percent-methanol free formaldehyde is added gradually, with cooling to maintain the temperature at 100—110°C., over a 30-minute period. When the formaldehyde addition is complete, the condensation is continued at 105°C. for an additional 60 minutes. The resultant product is a dark colored resin with a viscosity of 8.5 poises at 25°C. and a solids content of 62.5 percent. The resin solution contains 1.28 percent-sulphur The following example illustrates the preparation of a dip-coating adhesive in accordance with the present invention.

EXAMPLE IX

The resin of example I is mixed with water, formaldehyde and caustic (soldium hydroxide) to prepare a mixture identified as "Composition A," and a butadiene polymer latex is mixed with water to form "Composition B." Composition A and B include the following parts by weight of the enumerated materials:

COMPOSITION A

| | |
|---|---|
| Resorcinol-formaldehyde-Resorcinol sulfide resin described above (solids content 67.5%) | 19 |
| Water | 237 |
| Formaldehyde, 37% aqueous | 10 |
| Caustic, 20% aqueous | 3 |
| | 269 |

COMPOSITION B

| | |
|---|---|
| Butadiene-vinylpyridine-styrene terpolymer latex (solids content 41%) | 244 |
| Water | 61 |
| | 305 |

The dip-coating composition is prepared by mixing composition A with composition B, and the resultant mixture is ready for immediate use.

The following example illustrates the application of the adhesive system of the invention to polyester fibers.

EXAMPLE X

Two-ply polyester tire cord of 1,100 denier, with 13 tpi singles and ply twists is run through a bath containing a mixture of composition A and composition B, as described above, a solids pickup of 9.2 percent. The dip treatment and the drying treatment which follow are conducted under light tension. The cords are dried to an essentially nontacky but uncured condition during 3-minutes treatment in a drying chamber in which the drying medium (hot air) was maintained at a temperature of about 375°F. The cords are ready for use, but may be wound up on rolls for storage and future use if desired, without ill effects.

The following are nonlimiting examples of various unvulcanized solid rubber compounds which may serve as matrices for incorporation of the cords prepared in accordance with the invention, whereby composites may be formed:

EXAMPLE XI

| | |
|---|---|
| Natural rubber (smoked sheet) | 50 |
| SBR rubber (copolymer of 75 parts butadiene-1,3 and 25 parts styrene) | 50 |
| Reclaimed rubber (whole tire, 50% rubber) | 30 |
| Carbon black | 40 |
| Zinc oxide | 5 |
| Stearic acid | 1.5 |
| Pine tar | 4 |
| Light mineral oil | 4 |
| Anitoxidant (condensation product of nonylated p-cresol and formaldehyde) | 1 |
| Accelerator CBS (N-cyclohyxyl-2-benzothiazole-sulfenamide) | 1.1 |
| Sulfur | 3.5 |

EXAMPLE XII

| | |
|---|---|
| Natural rubber | 100 |
| MPC black | 33 |
| Zinc oxide | 10 |
| Stearic acid | 2 |
| Pine tar | 2 |
| Antioxidant BLE (Condensation product of acetone and diphenylamine) | 1.5 |
| Accelerator SNS (N-tertiary-butyl-2-benzothiazolesulfenamide) | 0.4 |
| Sulfur | 3.5 |

EXAMPLE XIII

| | |
|---|---|
| Nitrile rubber (copolymer of 65% butadiene-1,3 and 35% acrylonitrile) | 100 |
| MPC black (medium processing channel black) | 50 |
| Zinc oxide | 5 |
| Stearic acid | 2 |
| Antioxidant, Catalin CAO-5 (2,2'-methylenebis (4-methyl-6-tert. butylphenol) | 1.0 |
| Accelerator, Vulcafor F | 1.5 |
| Sulfur | 1.5 |

EXAMPLE XIV

| | |
|---|---|
| Chloroprene polymer rubber Neoprene GN | 100 |
| Carbon black | 36 |
| Zinc oxide | 5 |
| Stearic acid | 2.5 |
| Tricresyl phosphate | 2.5 |
| Antioxidant, Catalin CAO-5 | 1 |
| Magnesium oxide | 4 |

EXAMPLE XV

| | |
|---|---|
| Isoprene polymer rubber (cis-1,4-polyisoprene) | 100 |
| MPC black | 50 |
| Zinc oxide | 5 |
| Stearic acid | 3 |
| Pine tar | 2.5 |
| Antioxidant "Nonox B" | 1.0 |
| Accelerator mercaptobenzthiazole | 1.5 |
| Sulfur | 2.0 |

EXAMPLE XVI

| | |
|---|---|
| Butyl rubber (copolymer of 98 parts isobutene and 2 parts isoprene) | 100 |
| MPC black | 24 |
| SRF black (semi-reinforcing furnace carbon black) | 16 |
| Zinc oxide | 5 |
| Extender oil (paraffinic base oil having: a specific gravity of 0.9; aniline point, 215° F.; S.S.U. 100° F., 508; S.S.U., 210° F., 58; pour pt. 30° F.; flash pt. 365° F | 12.5 |
| Antioxidant, Catalin CAO-1 (2,6 Di-tert-butyl-para-cresol) | 1 |
| Tellurium diethyl dithiocarbamate | 1.25 |
| N-nitroso-p-nitroso methyl aniline | 1.0 |
| Sulfur | 2.0 |

EXAMPLE XVII

| | |
|---|---|
| SRB rubber (copolymer of 72 parts butadiene-1,3 and 28 parts of styrene | 100 |
| MPC black | 50 |
| Zinc oxide | 5 |
| Stearic acid | 1.5 |
| Pine tar | 3 |
| Extender oil (as in Example 15) | 20 |
| Antioxidant, CAO-5 | 1 |
| Accelerator SNS | 0.4 |
| Sulfur | 2.0 |

It has been found beneficial to include in rubber matrices a small quantity of solid resin prepared in accordance with the invention (e.g., see examples IV and VI) and a quantity of methylene radical donor to react with the resin. Thus, for example, it is possible to include within any of the foregoing rubber recipes a resin according to the invention in a quantity level of about 2 to about 5 parts by weight on the rubber and an aldehyde, e.g., paraformaldehyde, in a quantity of about 1 to about 2.5 moles per mole of polyhydricphenol in the added resin. If desired, about 7 to about 10 percent by weight on the resin of hexamethylenetetramine may be substituted for the aldehyde. Other methylene donors may be used. These materials are normally added and thoroughly dispersed in the rubber during compounding of the ingredients (e.g., as in a Banbury or 2-roll open mill) and thereafter react with one another in the rubber matrix, furnishing a potential link between the rubber and the adhesive compositions described herein.

Because various changes and modifications can be made without departing from the spirit and nature of the invention, it is understood that the invention is not to be limited except by the appended claims.

We claim:

1. An adhesive composition for bonding textile fibers to rubber comprising: a liquid, two-stage condensation resin which is a reaction product of
   a. polyhydricphenol;
   b. about 0.05 to about 1 mole aldehyde per mole of polyhydricphenol; and
   c. his hydroxy phenyl sulfide which is reactive with said aldehyde, said resin including said sulfide in a ratio of from about 0.01 to about 1 mole per mole of polyhydricphenol; rubber latex in a weight ratio of about 2 to 12 parts latex solids per part of solids of said two-stage resin; and sufficient additional reactive aldehyde to provide a total of about 1 to 2½ moles of reacted and unreacted aldehyde in said composition per mole of polyhydric phenol.

2. Composition in accordance with claim 1 wherein said polyhydric phenol is a dihydric phenol in which the hydroxyl groups are in the meta position in respect to one another.

3. Composition in accordance with claim 1 wherein said polyhydricphenol is resorcinol, said aldehyde is about three-tenths to about seven-tenths moles of formaldehyde per mole of resorcinol and said bis hydroxy phenyl sulfide is present in an amount of about three-tenths to about seven-tenths per mole of resorcinol.

4. Composition in accordance with claim 1 wherein said latex is a butadiene polymer latex.

5. Composition in accordance with claim 4 wherein said butadiene polymer is a copolymer of a butadiene-1,3, styrene and vinyl pyridine.

6. Textile fibers having thereon the dried but essentially uncured residue of the adhesive of claim 1.

7. A textile reinforcing element which includes fibers in accordance with claim 6, said residue being present in a weight ratio of about 1 to about 15 parts per 100 parts of uncoated textile element.

8. A reinforced rubber product comprising a vulcanized solid rubber matrix containing rubber, carbon black and antioxidant, and, in tightly adherent contact therewith, textile reinforcement in accordance with claim 7.

9. A vulcanized pneumatic tire comprising rubber and textile reinforcement wherein said reinforcement is adhesively bonded to said rubber through a cured coating of the adhesive of claim 1.

10. A method of adhering fibers to rubber comprising applying to the surfaces thereof a layer of adhesive composition in accordance with claim 1, drying the resultant coating to an essentially uncured state, bringing the dried fibers into contact with rubber containing curatives, and vulcanizing the rubber while being held, under pressure, in contact with said fibers.

11. A reinforced rubber product comprising a vulcanized solid rubber matrix containing in admixture therewith the solid reaction product of claim 1.

12. Composition in accordance with claim 1 wherein said bis hydroxyphenyl sulfide is bis (2-hydroxy-5-methylphenyl) sulfide.